Jan. 16, 1934.  H. N. GILBERT  1,943,307
PURIFYING LIGHT METALS
Original Filed Aug. 24, 1931
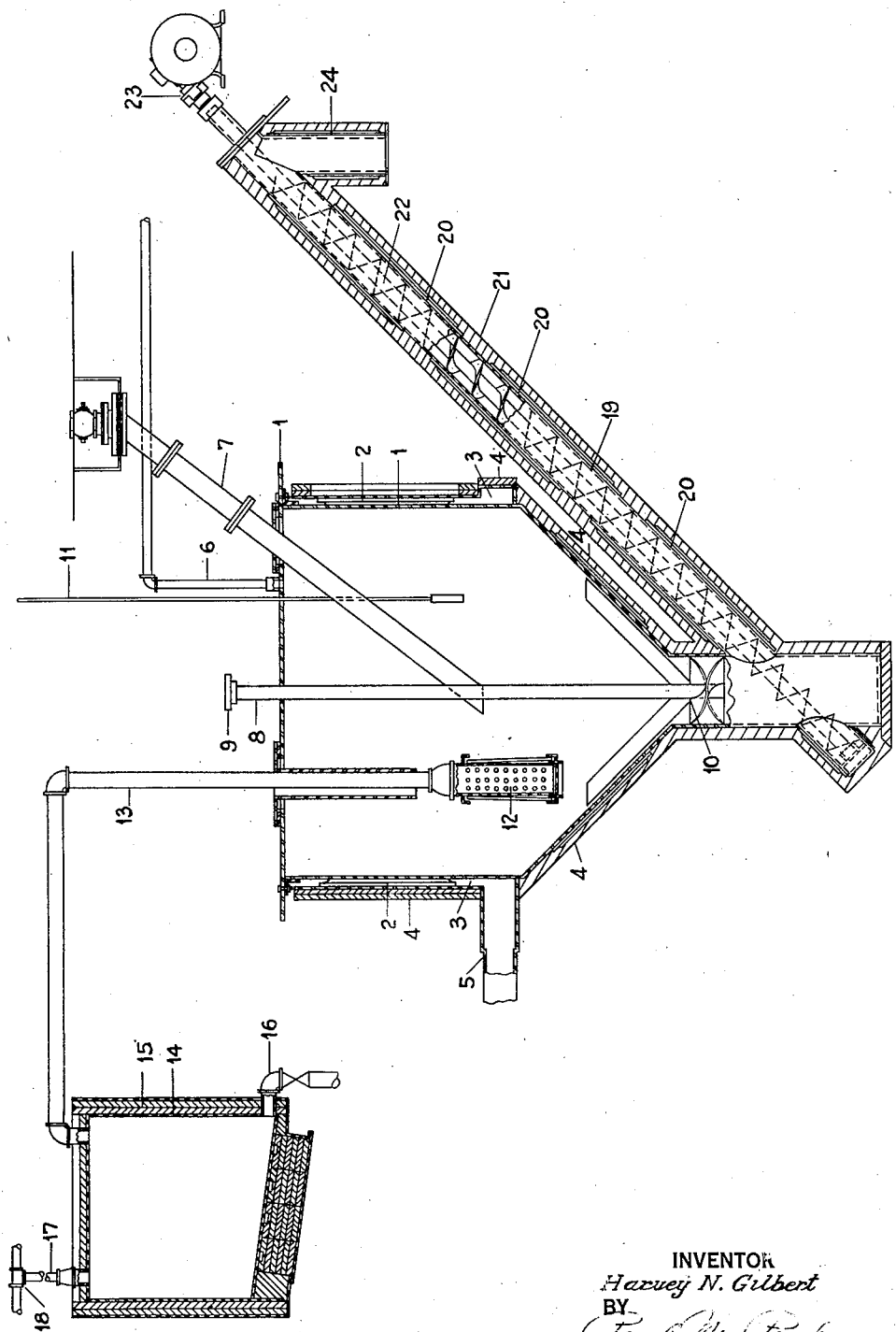
INVENTOR
*Harvey N. Gilbert*
BY
*Paul M. Paulson.*
ATTORNEY Patented Jan. 16, 1934

1,943,307

UNITED STATES PATENT OFFICE

1,943,307

PURIFYING LIGHT METALS

Harvey Nicholas Gilbert, Niagara Falls, N. Y., assignor, by mesne assignments, to E. I. du Pont de Nemours and Company, a corporation of Delaware Application August 24, 1931, Serial No. 558,859
Renewed April 6, 1933

10 Claims. (Cl. 75—17)

This invention relates to a process and apparatus for handling and purifying light molten metals.

Crude light metals and alloys commonly contain as impurities various oxides, salts or other metals, depending on the method of manufacture. Such metals are often purified by melting and filtering to remove the impurities which are infusible at the melting point of the metal. The more reactive light metals, such as the alkali metals, when purified in this way, must be handled in an inert atmosphere to prevent oxidation and hazards to the workmen.

The methods heretofore employed for filtering molten light metals are essentially batch processes and comprise forcing the metal through a filter medium in the bottom of a closed tank by means of gravity and a compressed, inert gas. When the batch of metal is filtered, the apparatus must be opened to remove the residual sludge, which contains considerable of the metal, mixed with the infusible impurities. The removal of the sludge involves certain hazards due to spattering and burning of the semi-molten mass. Furthermore, during this operation considerable oxidation of the sludge occurs, which reduces the yield of metal that may be recovered therefrom.

An object of this invention is to provide an efficient process and apparatus for molten metal purification which will give a product of consistently good quality with a minimum of metal loss. Another object is to provide a continuous process for filtering molten light metals. A further object is to reduce the hazard in purifying highly reactive light metals. A still further object is to reduce the amount of labor involved in purifying molten metals. Other objects will appear hereinafter.

These objects are attained, according to the present invention, by a novel process which comprises filtering substantially pure liquid metal in an inert atmosphere from a body of impure liquid metal which is replenished continuously, or intermittently, while the impurities are concomitantly collected and removed from the body of impure metal. A novel feature of the process is the removal of solids or semi-solids from the surface of the filter medium by a back-surge of a portion of the purified metal through the filter.

In the drawing, 1 is an iron tank fitted with suitable heating elements 2, cooling flues 3, and lagging 4. Pipe 5 is an inlet for cooling air which feeds to the flues 3 around tank 1; 6 is an inlet for inert gas; 7 is an inlet for impure metal. Shaft 8 is adapted to be powered by suitable means at 9 and is fitted with a combined agitator and scraper element 10. 11 represents a thermocouple connection. The immersion filter element 12 is a length of pipe having a plurality of comparatively large holes in the periphery and covered with several metallic screens of varying fineness in order of size from the largest mesh next to the pipe to the smallest mesh on the outside; these screens are sealed in at the ends of the element with heat resistant cement. The element 12 is connected by means of pipe 13 to the top of the receiving tank 14. Tank 14 is covered with insulating material 15 and is provided with a valve-fitted outlet 16 at the bottom, and at the top with outlet 17, which is connected to a two-way valve element 18. One side of the valve 18 is connected to a suction pump not shown, while the other side is connected to a gas container.

A large pipe 19, equipped with heating elements 20 and covered with lagging 21, is connected with the bottom of tank 1 and slopes upward at an angle of about 45°. Pipe 19 is fitted with screw-conveyor 22, which is adapted to be powered at 23 by suitable means. Discharge pipe 24 is connected near the upper end of pipe 19 at a point above the intended level of liquid in tank 1.

When my invention is used for obtaining pure sodium from the crude electrolytic metal containing as solid impurities, sodium chloride, sodium oxide, calcium and calcium chloride I may proceed as follows. The apparatus shown in the drawing is filled with nitrogen passed in through pipe 6, crude liquid metal is fed into tank 1 by way of pipe 7. The temperature of the molten metal, as indicated by the thermocouple element 11, is maintained above 100° C. for instance at 100–120° C. by suitably controlling the rate of cooling air flow through pipe 5 and flues 3 and the heating elements 2. Agitator 10 is operated at about 18 R. P. M. and valve 18 is adjusted to partially evacuate tank 14. This partial vacuum draws substantially pure sodium from the body of metal through immersion filter element 12 and pipe 13 into receiver 14. When the receiver is full or at other times, if plugging of the filter occurs, valve 18 is actuated to shut off the vacuum and simultaneously release inert gas under a slight pressure in its stead. The sudden change in pressure in tank 14 causes a momentary surge of the column of liquid metal contained in pipe 13 back into tank 1, thus forcing accumulated material from the filter element. During the filtration, the impurities of greater specific gravity which may be solid or semi-solid, settle to the bottom of the mildly agitated body of liquid metal. The agitating element 10 partially scrapes the cone-shaped lower sides of tank 1, assisting in that way to collect these solids, which I term "sludge", near the conveying means. The conveying element 22 is adapted to carry off these materials either continuously or intermittently. The screw in the conveyor fits loosely in the pipe, so that when operated at a suitable speed, it elevates the sludge outward and upward to the discharge pipe 24 while as much as possible of the liquid metal is allowed to drain back into the tank.

*Example 1*

Crude sodium as described above was purified by means of an apparatus constructed in accordance with that shown in the drawing. During the process, the level of liquid metal in tank 1 was maintained above the top of the filter unit 12. An inert atmosphere under slight pressure was maintained above the metal by leading in nitrogen by way of pipe 6. The temperature of the molten metal in tank 1 was maintained at 100–120° during filtration. Agitator 10 was continuously rotated at approximately 18 revolutions per minute and screw element 22, when in use, rotated at about 105 revolutions per minute. The screw element was set at an angle of about 40° from the perpendicular and the screw pitch was 6 inches.

Portions of crude liquid sodium were introduced through pipe 7. After each addition, suction was applied to the receiver 14 and filtered sodium was drawn therein until the level in tank 1 was near the top of filter unit 12. Valve 18 was then operated to cut off the suction and admit nitrogen into tank 14. The purified sodium was removed from tank 14 by means of the valved pipe 16.

During the filtration, a sludge consisting of solid calcium and salts and oxides of calcium and sodium settled out in the bottom of tank 1; this sludge, wet with liquid metal, was discharged by way of pipe 24 by intermittent operation of screw element 22.

The purified metal and the sludge from each batch were analyzed; the following results are the average from 24 consecutive filtrations:

Average content of impurities in filtered sodium, 0.025%.

The total weight of the sludge was about 8.6% of the total weight of the crude sodium introduced into the apparatus.

The sludge contained about 69% of metallic sodium.

The total weight of sodium in the sludge was equivalent to about 6% of the weight of the purified sodium.

The process is most effective when the temperature is so maintained that substantially all impurities are solid and more efficient when the sludge outlet means is so constructed and sufficiently slanted to allow excess liquid metal to drain back to the filtering chamber.

By means of my invention, higher yields may be obtained than was possible with prior methods. For instance, in the purification of sodium by prior methods, a minimum of around 14% of the metal was removed with the sludge and the impurities could not be reduced below 0.045%. With my process only 5–10% of the metal is removed with the sludge and the impurities have been reduced to as low as 0.025%.

A further important advantage of my method over prior methods is that it may be operated continuously or intermittently. It is not necessary to stop operation to add raw metal, clean the filter, or remove sludge.

Since the handling of molten metals, especially the more reactive metals, is attended by considerable hazard, this invention renders a much safer method for purifying such metals and provides a closed, controlled system adapted to carry out the entire process with one apparatus. The metal is continuously maintained under an inert atmosphere, preventing substantially all oxidation. The apparatus may be operated by vacuum rather than pressure and thereby reducing hazards caused by leakage. By the use of my invention, there is a substantial saving in floor space, labor, and oxidation losses.

The removal of sludge from filtration of liquid metal such as sodium has always been difficult to control with any of the known types of valves. The sludge tends to solidify in the valve, preventing complete closure, causing leakage or obstructing the flow. Often the solidified sludge makes operation of the valve so difficult that the operator applies undue force which is liable to break the valve or its connections. This constitutes a serious hazard when a considerable body of liquid metal lies above the valve. My invention overcomes these disadvantages by providing a substantially valveless system for sludge removal.

Various modifications of my invention may be made without departing from the spirit and scope thereof and although my process is designed to be operated continuously it may be operated intermittently with satisfactory results. It is also possible to employ pressure on the surface of the body of molten metal in order to assist in filtering operations, or even to entirely replace vacuum filtering by pressure filtering. Other types of immersion filter bodies may be substituted for that herein described. The conveyer may be arranged at varying angles and satisfactory results obtained as long as the discharge opening is located at some point above the level of the molten metal. Other known types of conveyers may be substituted for the type shown herein. The process is obviously applicable to various light metals and alloys.

By the term "light metals" in the specification and claims, I mean all metals or alloys which, at any temperature in the molten state, may contain solid impurities heavier than the liquid metal; I particularly include the alkali and alkaline earth metals. The term "inert gas" is used to designate any gas which is substantially nonreactive with the metal being refined at the refining temperature.

I claim:

1. Process for purifying crude light metals comprising maintaining said light metal liquid in an inert atmosphere and at a temperature at which impurities have solidified, withdrawing light metal from said liquid through a filter and concomitantly collecting and removing sludge from said liquid from a level below filtration.

2. Process for purifying crude alkali metal comprising maintaining said alkali metal liquid in an inert atmosphere and at a temperature at which impurities have solidified, withdrawing alkali metal from said liquid through a filter and concomitantly collecting and removing sludge from said liquid from a level below filtration.

3. Process for purifying crude electrolytic sodium comprising maintaining said sodium liquid in an inert atmosphere and at a temperature at which impurities have solidified, withdrawing sodium from said liquid through a filter and concomitantly collecting and removing sludge from said liquid from a level below filtration.

4. Process for purifying crude electrolytic sodium comprising maintaining said sodium liquid at 100°–120° C. in an inert atmosphere, withdrawing sodium from said liquid through a metal filter screen and concomitantly collecting and removing sludge while permitting drainage of molten sodium back into the container from said sludge being removed.

5. Process for purifying crude electrolytic sodium comprising continuously maintaining said sodium liquid at 100°–120° C. in an inert atmosphere, mildly agitating, continuously adding crude sodium and continuously withdrawing sodium from said liquid through a metal filter screen, and concomitantly collecting and removing sludge while permitting drainage of molten sodium back into the container from said sludge being removed.

6. Process according to claim 2 wherein the flow of alkali metal through the filter is reversed at intervals to clean said filter.

7. Process according to claim 5 where the flow of sodium through the metal filter screen is reversed at intervals in order to clean said screen.

8. Device for purifying crude electrolytic light metal comprising a closed metal chamber provided with heating and cooling means, inlet pipes for crude light metal and inert gas, a filter means within said chamber, an outlet means extending from said filter means to an outside connected collecting chamber, means for scraping and agitation within said chamber and below said filter, and means for removing solids from a level below said scraping means.

9. Device for purifying crude electrolytic sodium comprising a closed metal chamber provided with heating and cooling means, inlet pipes for sodium and inert gas, a filter means within said chamber, a pipe extending from said filter means to an outside suction and pressure connected collecting container, scraping and agitating means within said chamber and below said filter, and a conveyor for solids extending from said chamber outward and upward from a level below said scraping means.

10. Device for purifying crude electrolytic sodium comprising a closed metal chamber provided with heating and cooling means, inlet pipes for sodium and inert gas, a metal filter screen within said chamber, a pipe extending from said filter to an outside suction and pressure connected collecting container, a mechanically driven scraper and agitator within said chamber and below said filter, and a motor driven screw conveyor extending from said chamber outward and upward from a level below said scraper.

HARVEY NICHOLAS GILBERT.